United States Patent [19]
McCorkle, Jr.

[11] Patent Number: 5,609,451
[45] Date of Patent: Mar. 11, 1997

[54] DISPLAY UNIT WITH IMPROVED SUPPORT FEET

[75] Inventor: Donald E. McCorkle, Jr., Dearing, Ga.

[73] Assignee: McStack USA, Marietta, Ga.

[21] Appl. No.: 358,093

[22] Filed: Dec. 16, 1994

[51] Int. Cl.⁶ ........................................ B60P 7/135
[52] U.S. Cl. .......................... 410/90; 410/76; 410/77; 211/194
[58] Field of Search .................... 410/71, 76, 77, 410/80, 90, 91, 156; 108/53.1, 53.5, 53.3, 91, 55.3; 211/194; 248/501, 502; 296/3

[56] References Cited

U.S. PATENT DOCUMENTS

| | | |
|---|---|---|
| Re. 23,848 | 7/1954 | Gerhardt . |
| 2,919,661 | 1/1960 | Caputo et al. ............................. 410/90 |
| 2,940,597 | 6/1960 | Machielse et al. ................. 108/53.5 X |
| 3,057,489 | 10/1962 | Gilliam, Jr. . |
| 3,118,249 | 1/1964 | Bard et al. . |
| 3,160,120 | 12/1964 | Skubic ..................... 108/53.5 |
| 3,506,138 | 4/1970 | Travis ................. 108/53.5 X |
| 3,803,380 | 8/1974 | Spencer . |
| 3,893,705 | 7/1975 | Allen . |
| 4,199,069 | 4/1980 | Talarico .................................. 211/194 |
| 4,565,402 | 1/1986 | Hopkins . |
| 4,737,055 | 4/1988 | Scully ....................................... 410/76 |
| 5,037,256 | 8/1991 | Schroeder . |
| 5,108,141 | 4/1992 | Anderson . |
| 5,233,931 | 8/1993 | McCorkle, Jr. . |
| 5,433,322 | 7/1995 | Williams ............................. 211/194 X |

FOREIGN PATENT DOCUMENTS

| | | |
|---|---|---|
| 93547 | 1/1962 | Denmark . |
| 2234167 | 1/1975 | France ..................................... 410/90 |
| 2250812 | 4/1974 | Germany ............................... 211/194 |
| 5-16875 | 1/1993 | Japan ....................................... 410/90 |
| 777986 | 1/1957 | United Kingdom ................... 211/194 |

*Primary Examiner*—Karen B. Merritt
*Assistant Examiner*—Stephen Gordon
*Attorney, Agent, or Firm*—Dickinson, Wright, Moon, Van Dusen & Freeman

[57] ABSTRACT

An improved shelving assembly for transporting and displaying goods on a carrier incorporates a cylindrical shoe with a rounded top and a lower flange that compliments the shape of a series of posts set into the bed of the carrier. The posts set into the bed of the carrier are preferably arranged so that the shelving units tilt inward toward the center of the truck bed, thereby reducing the shifting and spillage of items placed on the units while at the same time shifting the weight of the load toward the center of the carrier bed.

6 Claims, 4 Drawing Sheets

DISPLAY UNIT WITH IMPROVED SUPPORT FEET

FIELD OF THE INVENTION

This invention relates to an improved post and shoe assembly for use in mounting shelving units on a carrier, and to an improved shelving assembly which incorporates the post and shoe assembly.

BACKGROUND OF THE INVENTION

Each year, businesses incur considerable expenses from goods that are damaged during transportation on trucks, trains, and other carriers. The problem is especially severe for fragile goods such as plants, which are usually shipped in loose arrangement on shelving units. Thus, nurseries, for example, lose a significant portion of their profit margin to plants that are mutilated or destroyed during transportation from the nursery to the customer.

Much of the damage to goods that occurs during transportation on a carrier arises from spillage or movement of the goods when the carrier makes turns. Even at modest speeds, the centrifugal forces acting on items stacked on a shelving unit forces the items away from the center of the carrier bed when the carrier makes a turn, resulting in shifting and spillage of the goods if they are not adequately secured.

A number of attempts have been made to develop shelving assemblies that will prevent spillage of goods stacked upon them. For example, U.S. Pat. No. 5,037,256 (Schroeder) discloses a dunnage bar lock arrangement supported on vertical struts. The arrangement is useful for the shipment of paneled goods, such as automobile doors. The paneled goods are supported on parallel horizontal bars, and are kept separate by dividers that are supported on a central horizontal bar. The usefulness of this device is limited to paneled goods.

Shelving assemblies have been developed that are supported on posts that interface with rectangular apertures set into the bed or sides of a carrier. U.S. Pat. No. 5,108,141 (Anderson), for example, discloses a rack for a truck canopy. The rack consists of a series of vertical and horizontal struts, which interconnect into a framework. The vertical struts of the framework are supported on bases, which fit into holes with rectangular braces provided along the top of the walls of the truck bed.

Alternatively, shelving assemblies may be equipped with hollow rectangular shoes that interface with similarly shaped posts or protrusions provided along the bed of a carrier. Thus, U.S. Pat. No. 4,565,402 (Hopkins) discloses units of a support frame for a truck bed. The units are hollow rectangular posts that receive rectangular struts. U.S. Pat. No. 3,830,380 (Spencer) discloses a multi-level container for carrying construction materials and includes a series of vertically stackable shelving assembly. The vertical struts of the shelving assembly have hollow rectangular shoes that fit over the rectangular posts of a base frame secured to the bed of a truck.

Shelving assemblies provided with rectangular shoe and post assemblies have the advantage that they resist rotational movement of the assembly and prevent it from tipping over, thereby ensuring that the shelving assembly remains securely attached to the carrier bed. However, this type of shoe and post assembly does not reduce the centrifugal force on items which are stacked upon the shelving units, and thus does not reduce shifting and spillage of those items. Furthermore, this type of shoe and post assembly requires precise alignment of the shoes and posts when the shelving assembly is assembled or mounted on a carrier bed. This results in significant difficulties if the shelving assembly is not manufactured with precise uniformity or if the dimensions of the assembly change slightly with age or use. Furthermore, the posts can only be disengaged from the shoes by lifting the shelving units in a direction perpendicular to the base of the shoe, which is undesirable when the shelving units are heavy or are loaded with merchandise. Also, because of the large surface area of contact between the shoes and the posts, there is a pronounced tendency for the posts to stick to the sides of the shoes if they are left engaged for an extended period of time.

Some shelving assemblies have rounded support posts that engage rounded shoes. U.S. Pat. No. 3,118,249 (Bard et al.) discloses a shelving assembly for mushrooms in which the individual shelving units are vertically stacked so that the rounded support posts of each unit engages the rounded shoes of the neighboring unit. Danish patent 93547 discloses a similar shelving unit, except that the rounded shoes are tapered outwardly from the interior of the shoe.

While the rounded shoe and post assemblies disclosed in these references solve some of the problems associated with rectangular shoe and post assemblies, they are still unsatisfactory in some respects. For example, the shoes of the shelving assembly disclosed in U.S. Pat. No. 3,118,249 have wide rims which meet the rounded portion at a sharp angle, as illustrated in FIG. 7 of that reference. As with rectangular shoe and post assemblies, this requires precise alignment of the shoe with the post when the shelving assemblies are being put together, a feature which, as noted before, is undesirable when the shelving units are heavy or are loaded with merchandise. More importantly, however, the engaging power of the shoe to the post is compromised by this design as compared to the design involving rectangular posts and receptacles, since the rounded surface of the post provides significantly less resistance to tilting of the shelving assembly when torque is applied to the post. Thus, shelving units incorporating this type of shoe and post assembly tend to tip over easily or to disengage from neighboring units when the shelving assembly as a whole is jolted. The problem is even more severe for shelving assemblies of the type disclosed in Danish patent 93547 since the shoes in those assemblies are tapered outwardly, thus providing even less resistance to disengagement. Thus, while shelving assemblies of that type are suitable for their intended purpose (i.e., as cheese shelves in a cheese warehouse), they are unsuitable for use in transporting and displaying goods on a carrier.

In an attempt to reduce movement or spillage of goods stacked on shelving units on a carrier, a number of shelving assemblies have been developed which are tilted inwardly toward the center of the truck bed. The tilting of the shelving assembly reduces the tendency for items stacked on the shelving units to shift or spill in response to centrifugal forces. Thus, for example, U.S. Pat. No. 3,893,705 (Allen) relates to a system for transporting sheets of glass on a truck. According to the system, sheets of glass are mounted on vertical shelving units consisting of separate support frames that tilt inwardly towards each other. The shelving units are supported on wheels which fit into grooves set in the truck bed. U.S. Pat. No. 3,057,489 (Gilliam) relates to a truck body for carrying bottle cases in a shelving assembly. The truck body is equipped in the center with a flange that terminates in roller bearings and is supported on a hydraulic lift. The sides of the truck are fitted with hinges. The shelving assembly is supported on one side by the hinges and on the other side by the roller bearings. In use, the hydraulic lift is lowered after the bottle cases have been loaded so that the shelving assembly tilts inwardly toward the center of the truck bed. U.S. Pat. No. Re. 23,848 (Gerhardt) discloses a shelving assembly for transporting stacked articles. The assembly consists of opposite rows of shelving units which are hinged to the side of the truck and which tilt inwardly toward the center of the truck bed. The shelving assembly is secured along the center of the truck bed by a z-shaped shoe.

While these shelving assemblies are designed to prevent shifting or spillage of items stacked on them, they suffer from many infirmities which make them unsuitable for the present purposes. The device of U.S. Pat. No. 3,893,705 (Allen), for example, is suitable only for use with paneled goods, such as sheets of glass, while U.S. Pat. No. 3,057,489 (Gilliam) and U.S. Pat. No. Re. 23,848 (Gerhardt) require specially designed truck beds.

Applicant's shelving assembly proposed in U.S. Pat. No. 5,233,931 (McCorkle) is useful for transporting plants and other fragile goods and addresses many of the infirmities of the prior art. The shelving units of that assembly are provided with semi-spherical shoes. The present invention, which represents a further improvement of the design of that rack, provides greater resistance to tilting of the shelving assembly, while at the same time being easier to mount and dismount than shelving units equipped with rectangular shoe and post assemblies. The shelving assemblies of the present invention also provide greater resistance to spillage or movement of goods stacked on the shelving assembly during transportation on a carrier.

SUMMARY OF THE INVENTION

The invention is an improved shelving assembly for transporting and displaying goods on a carrier. The shelving assembly incorporates a uniquely shaped cylindrical shoe with a rounded top that compliments the shape of a series of posts set into the bed of the carrier and includes a flange extending outwardly of the cylindrical part. This flange has been found to greatly facilitate placement of the shoes over the posts and to spread the weight of the unit over a larger area.

The posts set into the bed of the carrier are preferably arranged so that the shelving units tilt inwardly, toward the center of the truck bed. This reduces the shifting and spillage of items placed on the units and moves the weight of the overall load toward the center of the carrier bed to resist centrifugal forces on the units.

DETAILED DESCRIPTION OF THE PREFERRED EMBODIMENT

The invention is an improved shelving assembly for transporting and displaying goods on a carrier. The shelving assembly incorporates a uniquely shaped shoe with a rounded top that compliments the shape of a series of posts mounted on the bed of the carrier. Shelving units suitable for use with the shoes and posts of the present invention are disclosed in U.S. Pat. No. 5,233,931, the disclosure of which is incorporated herein by reference. It should be noted that in the Anderson structure as well as that shown in U.S. Pat. No. 3,830,380 (Spencer) the load is transferred at the edge of the foot. By transferring the load in the center of the foot, there is greater stability.

Figure 1:
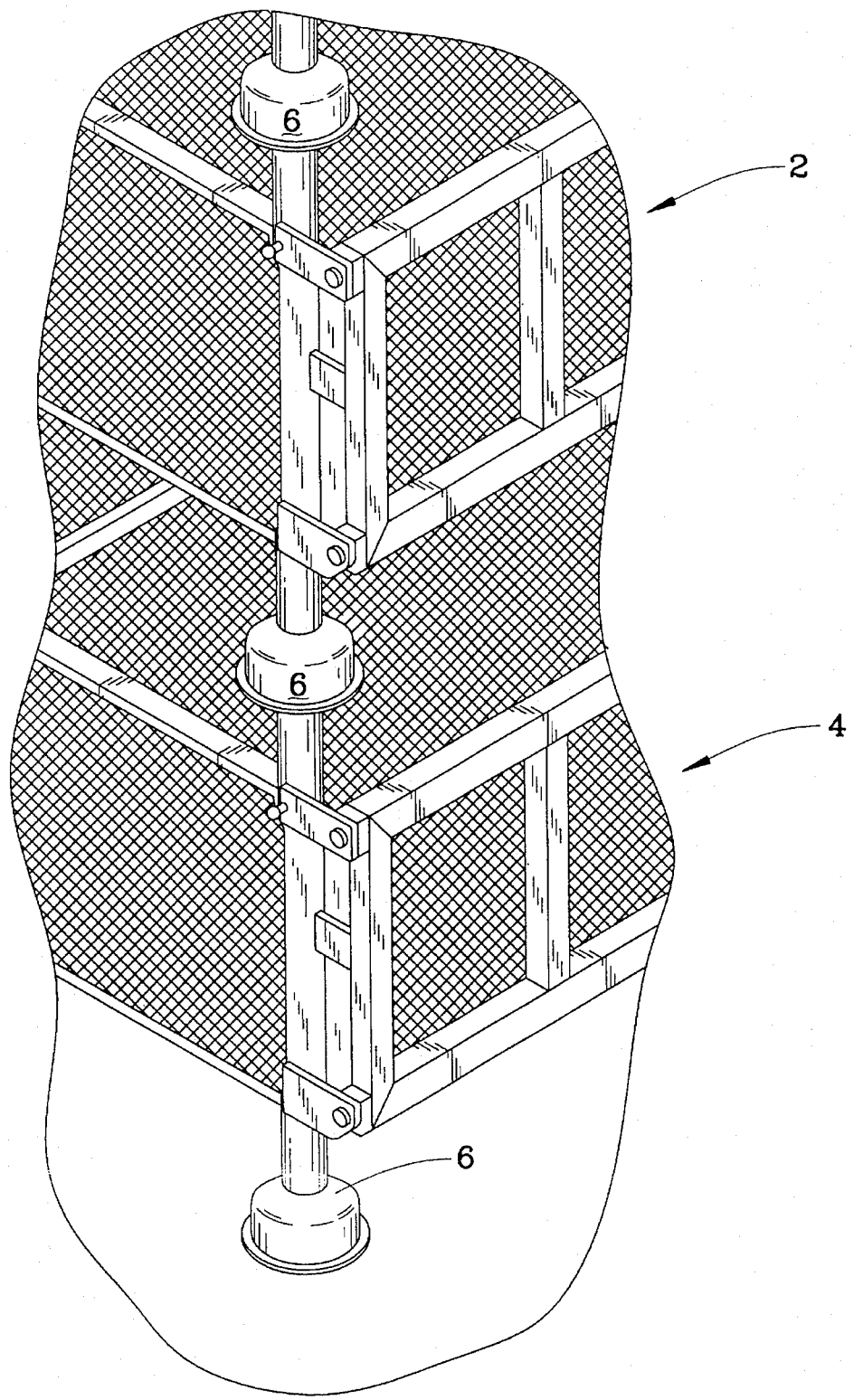
FIG. 1 is a partial perspective view of three stacked display units in accordance with the invention.

With reference to FIG. 1, an upper, intermediate tray 2 is mounted on a lower tray 4. Each of the trays has the general construction shown in previously mentioned U.S. Pat. No. 5,233,931. An important difference, however, lies in the shape of the shoe elements 6.

Figure 2:
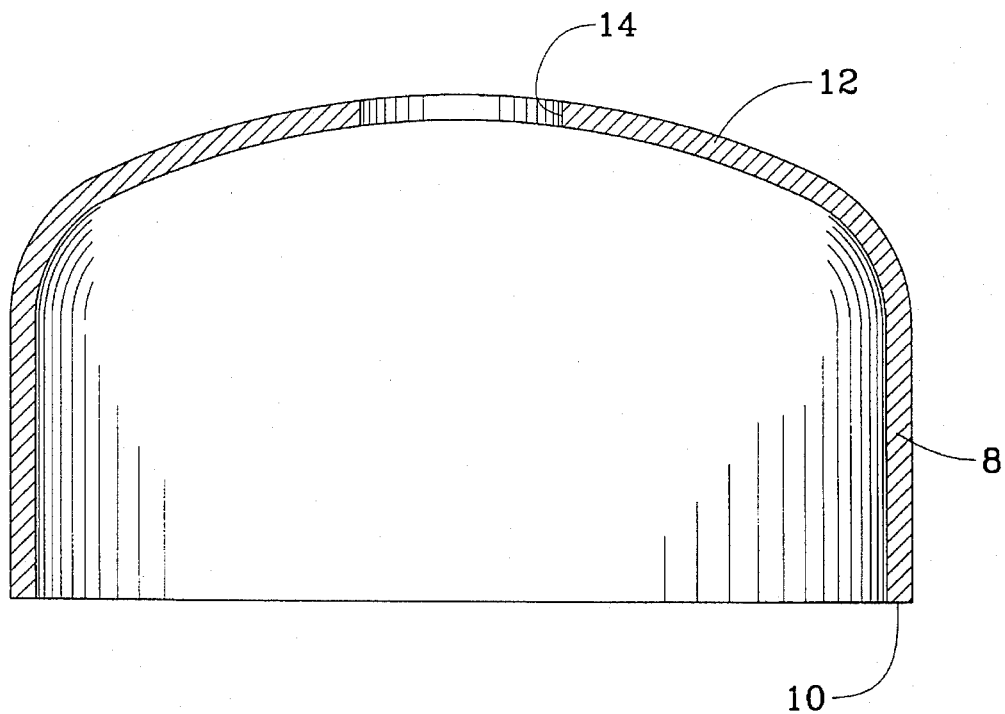
FIG. 2 is a vertical cross section of an earlier, prior art embodiment of a shoe for a display unit such as that shown in FIG. 1.

FIG. 2 shows a prior art version of a shoe. This shoe includes a cylindrical part 8 that terminates in a lower edge 10. A spherical dome 12 of large radius forms the top of the shoe, and includes a hole 14. The hole 14 is provided to receive the top of a lower post to secure the post in a central location, and such a hole is provided in the shoe shown in FIG. 3, as well. This hole also allows for drainage of water or other fluids that may collect in the post above.

Figure 3:
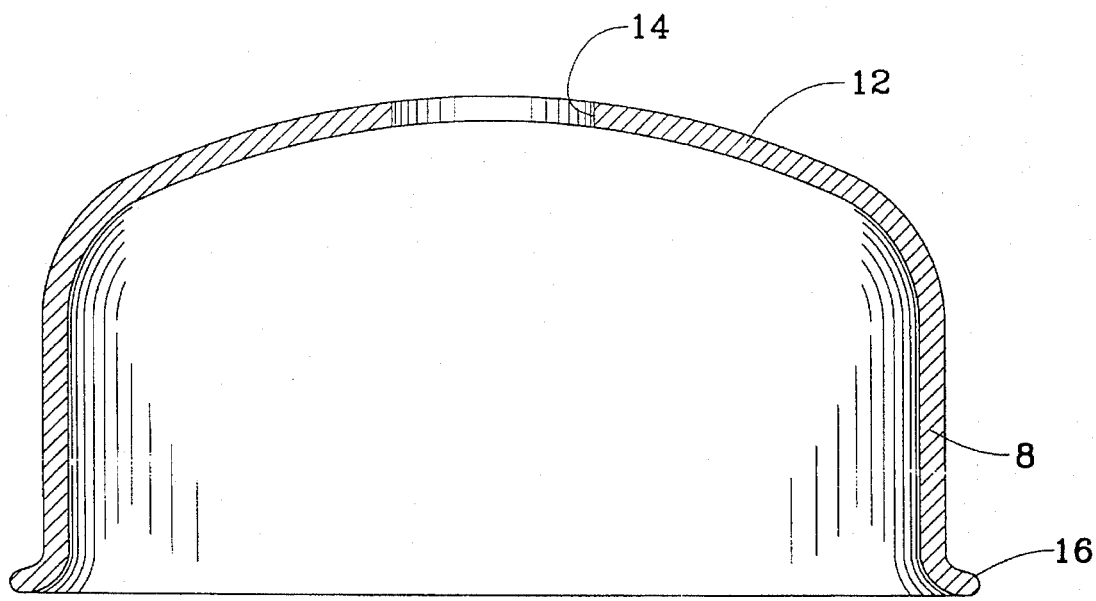
FIG. 3 is a vertical cross section of a shoe for a display unit in accordance with the invention.

FIG. 3 shows an improvement of the shoe shown in FIG. 2. In this improvement, the lower edge includes an outwardly directed flange 16. FIG. 3 is drawn to scale, the inner diameter of the cylindrical portion being preferably about 5 ⅞ inches, and the outer diameter of the bottom, including the flange being about 7¼ inches. The height of the shoe is preferably about 3⅛ inches. The radius of the dome is preferably about 5½ inches.

The flange 16 curves outward from the lower edge of the side 8 and extends from the side by about ¹¹⁄₁₆ inch. The radius of curvature of the connection between the flange and the side is about ½ inch.

The combination of the cylindrical portion, the flat dome, and outward flange as shown in FIG. 3 has several advantages over the semi-spherical feet shown in the noted prior patent and the foot shown in FIG. 2.

While the cylindrical portion 8 provides a more solid engagement between the shoe and a mounting element of similar shape than obtained before, the engagement between a supporting surface and the foot of FIG. 2 is concentrated on the sharp lower edge 10. This creates a problem when the supporting surface is soft, for example, soil or warm asphalt. The floor-contact surface area of the embodiment of FIG. 3, however, is significantly larger because of the flange 16. This larger surface area is important when a display tray is placed on the ground and prevents the shoe from being driven into the softer flooring materials such as soil, asphalt, etc. The flange, of course, also distributes the force on the lower edge of the foot when it is resting on a hard surface, such as the steel bed of a carrier, and reduces the wear incident to that contact.

Moreover, the provision of a flange assists in aligning the foot of a stacked tray with a vertical post because the enlarged area of the foot is an easier "target" for a forklift operator. As shown, the flange is tapered downward slightly so that a post engaging the flange will be guided toward the center of the shoe. This centering allows the weight of the above rack or racks to be transferred directly through the top of the domed foot to the post of the rack below.

Figure 4:
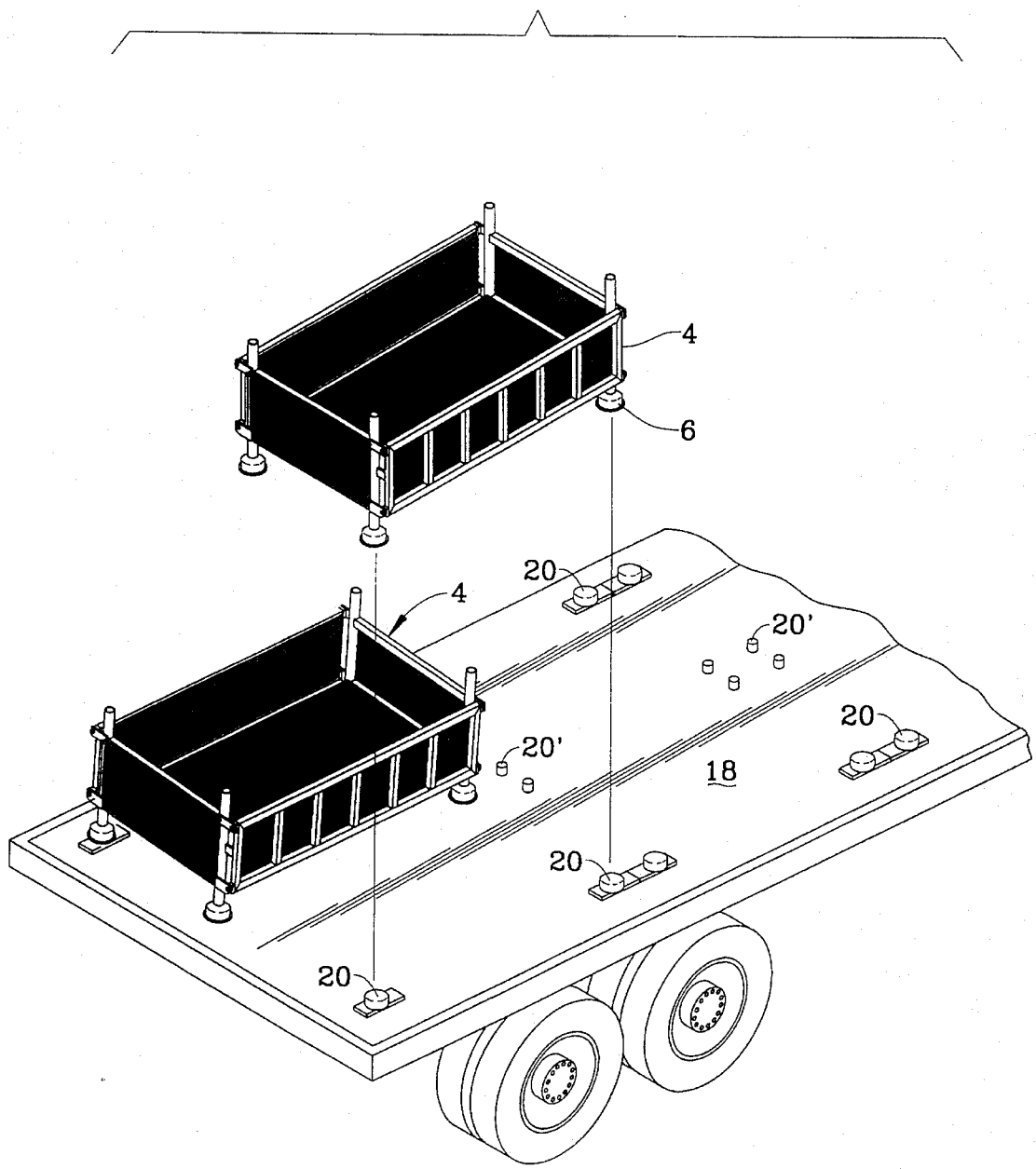
FIG. 4 demonstrates the mounting of the shelving assembly of the present invention on posts set into the bed of a truck.
Figure 5:
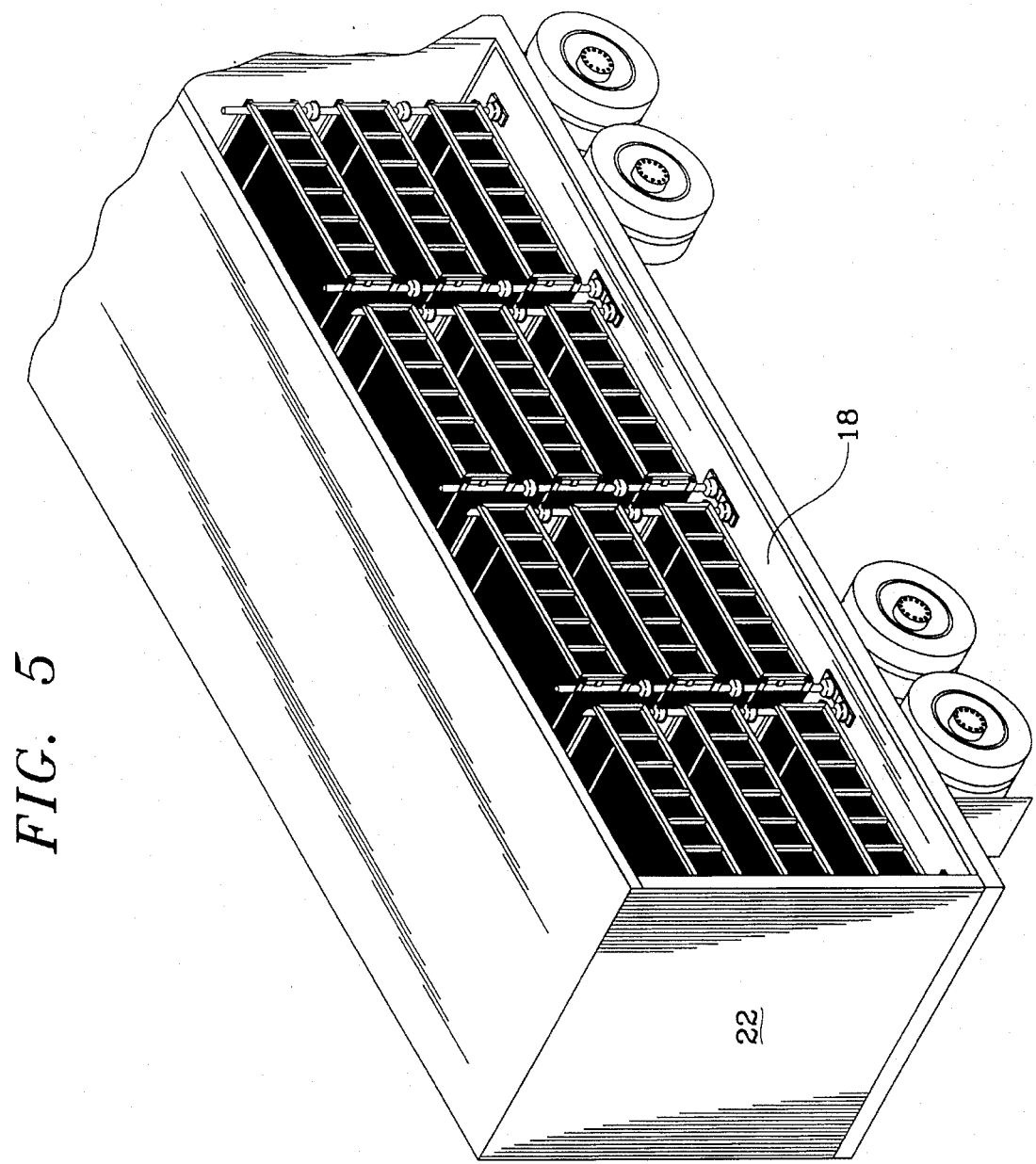
FIG. 5 shows an arrangement of the shelving assembly of the present invention on the bed of a truck.

FIGS. 4 and 5 illustrate the loading of the trays on trucks for transport. A flatbed trailer 18 is provided with a first plurality of mounting elements, or protrusions 20 and a second plurality 20. Each of these elements has cylindrical and domed parts shaped to correspond to the interior of a shoe, such as those shown in FIGS. 2 and 3. The mounting elements 20 are secured to the outer edge of trailer in any known manner, such as by bolts, and are spaced to engage respective ones of the feet on the display trays. The trays are loaded as shown in FIG. 4, for example, by the use of a fork lift that engages the bottom of a tray and sets it onto the trailer.

Arranging the mounting elements only on the outer edge of the trailer raises the outer edge of each tray above the inner edge of the tray, which tips the tray inward slightly. This assists in retaining the trays in place when they are subjected to centrifugal forces as the truck moves in a circular path. Alternatively, elements 20, on the outer edge, are mounted higher than elements 20', located inwardly, to achieve the same effect.

FIG. 5 shows a preferred embodiment of a trailer having a cover 22 for protection of the plants (not shown) or other objects carried in the trays.

The foregoing is intended only to convey an understanding of the present invention and is not intended to be limiting. Modifications within the scope of the present invention will be apparent to those skilled in the art.

What is claimed is:

1. A shelving unit, comprising:

a horizontal tray for supporting merchandise;

first support means extending below said tray for supporting said tray on a lower surface, and a narrow vertical post extending above said tray for engaging and supporting a second one of said shelving units; and a plurality of shoes attached to said first support means, each of said shoes having a cylindrical side having a width substantially greater than that of said vertical post, a rounded top extending from the upper edge of said cylindrical side, and a flange curving outward from a lower edge of said cylindrical side with a radius of curvature of about ½ inch and tapering downward slightly from said lower edge of said cylindrical side, said shoe encompassing an interior space for receiving a rounded protrusion.

2. In combination with the shelving unit of claim 1, a surface for supporting said shelving unit, said surface being equipped with a plurality of rounded protrusions for releasable engagement of said shoes.

3. The combination of claim 2, further comprising:

means for statically angling said shelving unit toward the center of said surface.

4. The combination of claim 2, wherein said plurality of rounded protrusions is divided into a first set of protrusions and a second set of protrusions, said first set being elevated on said surface with respect to said second set.

5. A shelving assembly for transporting and displaying merchandise, comprising:

a support surface equipped with a first set of rounded protrusions and a second set of rounded protrusions, the tops of said first set of rounded protrusions being oriented at a higher vertical position that the tops of said second set of rounded protrusions, said first set of rounded protrusions being placed further from the center of said support surface than said second set of rounded protrusions; and a shelving unit with at least one shelf for supporting and displaying merchandise, said unit having a plurality of support elements for supporting said at least one shelf, at least one of said support elements terminating in a shoe for releasable engagement of at least one protrusion in said first set of rounded protrusions, and at least another one of said support elements terminating in a second shoe for releasable engagement of at least one protrusion in said second set of rounded protrusions, and wherein each said shoe comprises a cylindrical side, a rounded top, and an outwardly directed, tapered flange that encompass an interior space for releasable engagement of a respective one of said protrusions.

6. A shelving assembly for transporting and displaying merchandise, comprising:

a support surface having a support area and a set of rounded protrusions at higher vertical positions than said support area, said set of rounded protrusions being placed further from the center of said support surface than said support area; and a shelving unit with at least one shelf for supporting and displaying merchandise, said unit having a plurality of support elements for supporting said at least one shelf, at least one of said support elements terminating in a shoe for releasable engagement of at least one protrusion in said set of rounded protrusions, and at least another one of said support elements terminating in a second shoe for engaging said support area, and wherein each said shoe comprises a cylindrical side, a rounded top, and an outwardly directed, tapered flange that encompass an interior space for releasable engagement of a respective one of said protrusions.

* * * * *